(12) United States Patent
Catania

(10) Patent No.: US 12,313,138 B2
(45) Date of Patent: May 27, 2025

(54) BRAKE ASSEMBLY HAVING A FRICTION MATERIAL MEASUREMENT SYSTEM

(71) Applicant: ArvinMeritor Technology, LLC, Troy, MI (US)

(72) Inventor: Michael Catania, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 393 days.

(21) Appl. No.: 17/859,556

(22) Filed: Jul. 7, 2022

(65) Prior Publication Data
US 2024/0011536 A1 Jan. 11, 2024

(51) Int. Cl.
F16D 66/02 (2006.01)
F16D 55/226 (2006.01)
F16D 66/00 (2006.01)

(52) U.S. Cl.
CPC ............ F16D 66/02 (2013.01); *F16D 55/226* (2013.01); *F16D 2066/006* (2013.01)

(58) Field of Classification Search
CPC ............................... F16D 66/02; F16D 55/226
See application file for complete search history.

(56) References Cited

U.S. PATENT DOCUMENTS

| 5,697,472 | A | * | 12/1997 | Walker | B60T 17/22 |
| | | | | | 192/30 W |
| 10,436,271 | B2 | * | 10/2019 | David | F16D 65/095 |
| 2016/0146279 | A1 | | 5/2016 | Philpott | |
| 2019/0024740 | A1 | | 1/2019 | Taylor et al. | |
| 2019/0249735 | A1 | * | 8/2019 | David | B60T 17/22 |
| 2020/0149860 | A1 | * | 5/2020 | Huang | B60T 17/22 |
| 2022/0397166 | A1 | * | 12/2022 | Roberts | B60T 13/36 |
| 2024/0011536 | A1 | * | 1/2024 | Catania | F16D 66/02 |

FOREIGN PATENT DOCUMENTS

| DE | 3612166 C2 * | 5/1995 | ............ F16D 66/02 |
| WO | WO-2020164885 A1 * | 8/2020 | ........... F16D 55/226 |

OTHER PUBLICATIONS

Philpott, Daniel, U.S. Appl. No. 17/671,923, filed Feb. 15, 2022; 37 Pages.

* cited by examiner

*Primary Examiner* — Vishal R Sahni
(74) *Attorney, Agent, or Firm* — Dickinson Wright PLLC

(57) ABSTRACT

A brake assembly having a friction material measurement system for measuring friction material of a brake pad assembly. The friction material measurement system has a tool and a member. The tool is fixedly positioned with respect to a brake carrier. The member is fixedly positioned with respect to the brake pad assembly.

20 Claims, 6 Drawing Sheets

BRAKE ASSEMBLY HAVING A FRICTION MATERIAL MEASUREMENT SYSTEM

TECHNICAL FIELD

This invention relates to a brake assembly that has a brake pad assembly that has friction material and a friction material measurement system.

BACKGROUND

A brake pad wear monitoring system is disclosed in U.S. Patent Publication No. 2016/0146279.

SUMMARY

In at least one embodiment a brake assembly is provided. The brake assembly includes a brake carrier, a brake caliper, a brake pad assembly, and a friction material measurement system. The brake caliper is moveably disposed on the brake carrier. The brake pad assembly is received in the brake carrier and is supported by the brake carrier. The brake pad assembly has a backplate and friction material that is disposed on the backplate. The friction material measurement system has a tool and a member. The tool is fixedly positioned with respect to the brake carrier. The member is fixedly positioned with respect to the brake pad assembly.

The tool and member may cooperate to provide visual information indicative of a state of wear of the friction material. The tool may have an indicator region. The state of wear of the friction material may be indicated where the member is aligned with the indicator region.

The tool may be separated from the brake caliper such that the tool does not contact the brake caliper. The tool may be mounted to the brake carrier. The tool may be mounted to a side abutment of the brake carrier. The side abutment may be engageable with a lateral side of the backplate to inhibit circumferential movement of the brake pad assembly.

The brake caliper may define a cavity. The brake pad assembly may be received in the cavity. The side abutment of the brake carrier may be received in the cavity. The tool may extend from the side abutment out of the cavity.

The tool may be disposed on a distal end surface of the side abutment. The distal end surface may be received in the cavity. The side abutment may have a tab. The tab may protrude from the distal end surface. The tab may extend through a hole in the tool.

The tool may have a first segment. The first segment may engage the brake carrier. The tool may have a second segment. The second segment may extend from the first segment in a direction that extends away from the brake carrier. The tool may have a third segment. The third segment may extend from the second segment. The third segment may be disposed outside of the cavity of the brake caliper. The tool may have an indicator region. The indicator region may be provided on the third segment.

In at least one embodiment, a brake assembly is provided. The brake assembly includes a brake carrier, a brake caliper, a first brake pad assembly, a second brake pad assembly, and a friction material measurement system. The brake caliper is moveably disposed on the brake carrier. The first brake pad assembly is supported by the brake carrier. The first brake pad assembly has a first backplate and a first friction material disposed on the first backplate. The second brake pad assembly is supported by the brake carrier. The second brake pad assembly has a second backplate and a second friction material that is disposed on the second backplate. The friction material measurement system includes a tool, a first member, and a second member. The tool is fixedly positioned with respect to the brake carrier. The first member is fixedly positioned with respect to the first backplate. The second member is fixedly positioned respect to the second backplate.

The first member may be fixedly mounted to the first backplate. The second member may be fixedly mounted to the second backplate.

The tool, the first member, and the second member may extend out of a cavity of the brake caliper. The first brake pad assembly and the second brake pad assembly may be received inside the cavity. The tool may be spaced apart from and may not contact the brake caliper. The first member may be spaced apart from and may not contact the brake caliper. The second member may be spaced apart from and may not contact the brake caliper. The first member may be spaced apart from and may not contact the brake carrier. The second member may be spaced apart from and may not contact the brake carrier.

The second member may overlap the first member such that the first member is positioned between the tool in the second member. The second member may extend over the first friction material of the first brake pad assembly. The second member may extend over the second friction material of the second brake pad assembly.

The tool may include a first indicator region. A state of wear of the first friction material may be indicated where the first member is aligned with the first indicator region. The tool may include a second indicator region. A state of wear of the second friction material may be indicated where the second member is aligned with the second indicator region.

An end of the first member may move closer to an end of the second member as the first friction material wears, the second friction material wears, or both. The tool may extend over the brake carrier. The end of the first member may extend over the brake carrier. The end of the second member may extend over the brake carrier. The end of the tool and the end of the first member may be positioned closer to a brake actuator mount of the brake caliper than the end of the second member is positioned to the brake actuator mount.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
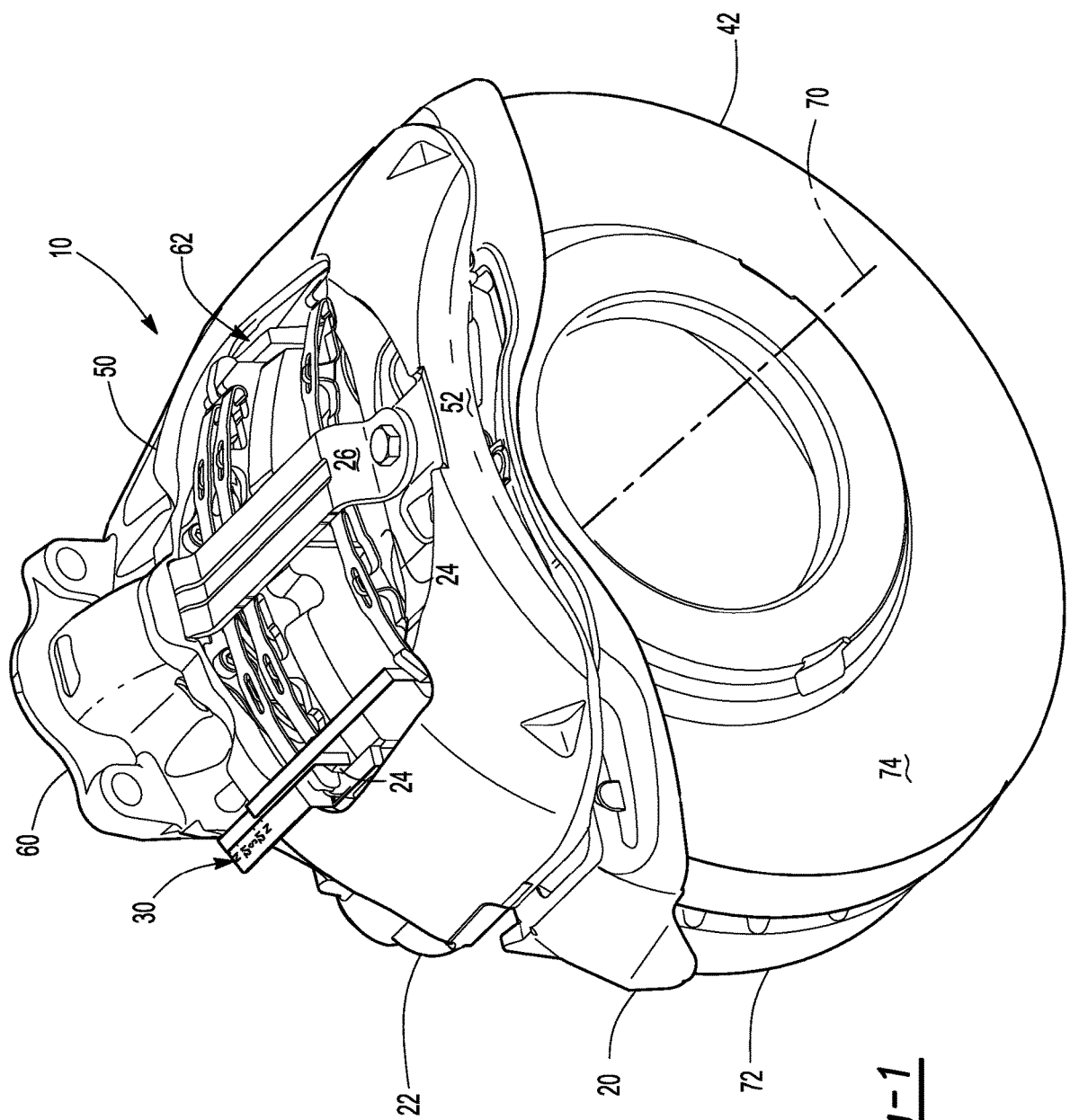
FIG. 1 is a perspective view of an example of a brake assembly and a brake rotor.
Figure 2:
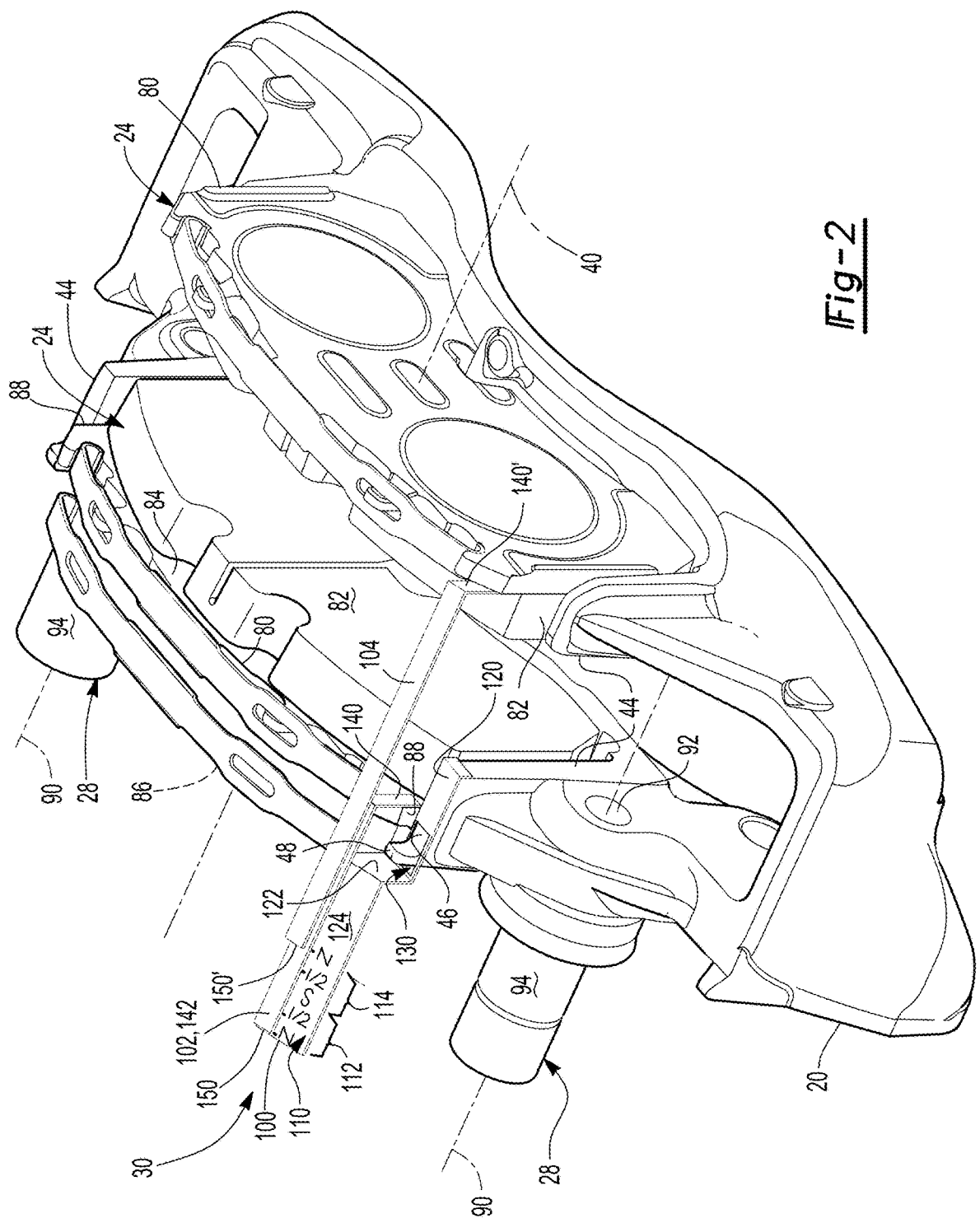
FIG. 2 is a perspective view of the brake assembly of FIG. 1 with the brake rotor, brake caliper, and retainer bracket omitted for clarity.

Referring to FIG. 1, an example of a brake assembly 10 is shown. The brake assembly 10 may be provided as part of a vehicle, such as a motor vehicle like a truck, bus, farm equipment, military transport or weaponry vehicle, emergency vehicle, cargo loading equipment for land, air, or marine vessels, or a trailer. The brake assembly 10 is configured as a disc brake. In at least one configuration, the brake assembly 10 includes a brake carrier 20, a brake caliper 22, a pair of brake pad assemblies 24, and a retainer bracket 26. The brake assembly 10 may also include various components that may facilitate movement of the brake pad assemblies 24, such as one or more guide pin assemblies 28 as shown in FIG. 2. The brake assembly 10 also includes a friction material measurement system 30.

Figure 3:
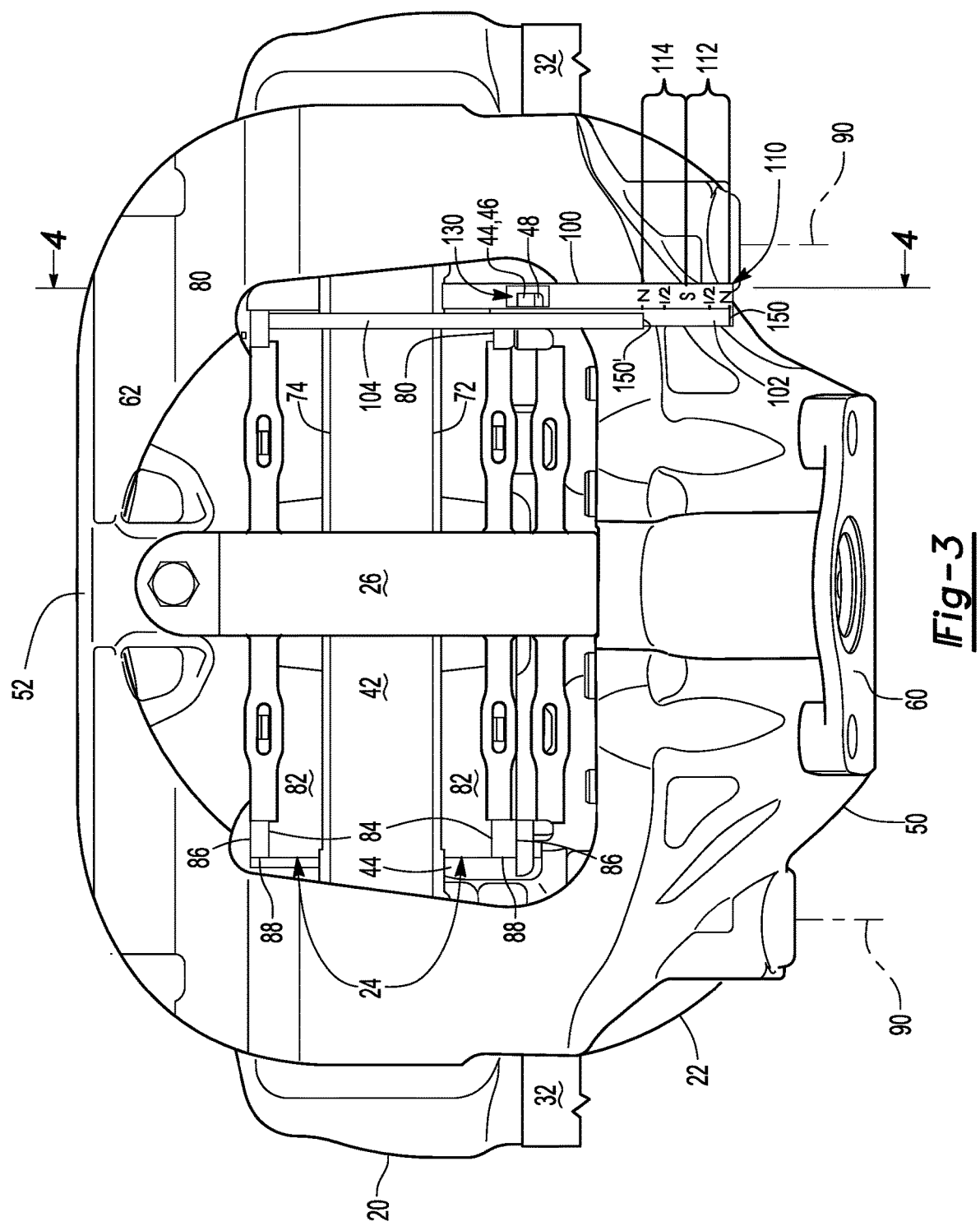
FIG. 3 is a plan view of the brake assembly with unworn brake pad assemblies.
Figure 4:
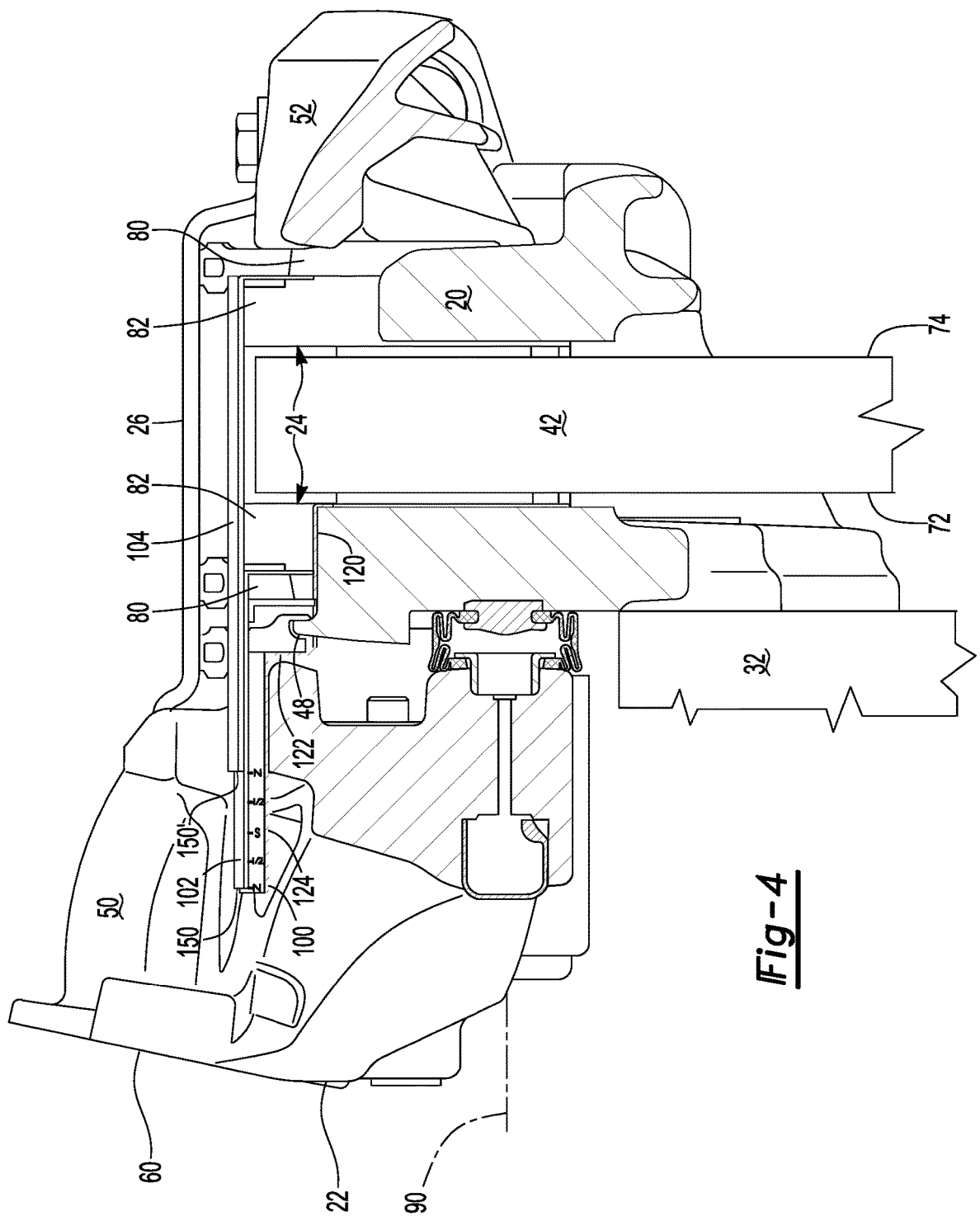
FIG. 4 is a section view along section line 4-4.

Referring to FIGS. 1-3, the brake carrier 20 is shown. The brake carrier 20 is configured to be fixedly mounted to the vehicle. For example, as shown in FIGS. 3 and 4 the brake carrier 20 may be directly or indirectly mounted to a structural component 32 like an axle assembly or a steering knuckle.

As is best shown in FIG. 2, the brake carrier 20 receives and supports the brake pad assemblies 24. The brake carrier 20 permits the brake pad assemblies 24 to move along an axis 40 toward and away from a brake rotor 42, which is best shown in FIG. 1. The brake carrier 20 may include a rotor opening through which the brake rotor 42 may extend. As such, the brake carrier 20 may straddle the brake rotor 42 and help position the brake pad assemblies 24 on opposite sides of the brake rotor 42.

The brake carrier 20 inhibits rotation of the brake pad assemblies 24 about the axis 40. For instance, the brake carrier 20 may engage multiple sides of a brake pad assembly 24, such as left, right, and bottom sides from the perspective shown in FIG. 2. In at least one configuration, the brake carrier 20 may one or more side abutments 44.

A side abutment 44 may be engageable with a lateral side of a backplate of a brake pad assembly 24 to inhibit circumferential movement of the brake pad assembly 24 or movement in a direction of rotation of the brake rotor 42. The side abutment 44 may have a distal end surface 46 and a tab 48.

The distal end surface 46 may be disposed at a free end of the side abutment 44. As such, the distal end surface 46 may face away from an axis of rotation of the brake rotor 42 and may be received inside a cavity in the brake caliper 22 that also receives the brake pad assemblies 24.

The tab 48, if provided, may protrude from the side abutment 44. For instance, the tab 48 may protrude from the distal end surface 46. The tab 48 may facilitate alignment of a tool of the friction material measurement system 30 with the brake carrier 20 as will be discussed in more detail below.

Referring to FIG. 1, the brake caliper 22 is moveably disposed on the brake carrier The brake caliper 22 facilitates positioning of the brake pad assemblies 24 with respect to the brake rotor 42 to facilitate braking of the vehicle. In at least one configuration, the brake caliper 22 may include a caliper housing 50 and a caliper bridge 52.

The caliper housing 50 may be moveably disposed on the brake carrier 20. For example, the caliper housing 50 may be slidably disposed on a pair of guide pin assemblies 28 that may be fixedly coupled to the brake carrier 20 as shown in FIG. 2. As shown in FIGS. 1 and 3, the caliper housing 50 may have a brake actuator mount 60 that may facilitate mounting of a brake actuator that may exert force to extend the brake pad assemblies 24 toward the brake rotor 42. The brake actuator mount 60 may be provided on a side of the brake carrier 20 that faces away from the brake rotor 42 and may be disposed opposite the caliper bridge 52.

The caliper housing 50 may have a body that may define an internal chamber that may receive various components that facilitate movement of the brake pad assemblies 24, such as an operating shaft, yoke, tappet, piston, a wear adjuster mechanism, or combinations thereof. The body may also define an opening through which a shaft of the brake actuator may extend. The brake actuator may be operatively connected to the wear adjuster mechanism. The wear adjuster mechanism may be configured to maintain a desired running clearance between the brake pad assemblies 24 and the brake rotor 42 when the brake pad assemblies 24 are in a retracted position. As an overview, the wear adjuster mechanism may permit the axial position of a brake pad assembly to be adjusted or moved closer to the brake rotor 42 in response to wear of the friction material 82. The wear adjuster mechanism may be provided in various configurations, some examples of which are disclosed in United States Patent Publication No. 2019/0024740, which is hereby incorporated by reference in its entirety.

The body of the caliper housing 50 may also define a pair of guide pin openings. A guide pin opening may receive a corresponding guide pin assembly 28 that facilitates sliding movement of the caliper housing 50 with respect to the brake carrier 20 as will be discussed in more detail below.

Referring to FIGS. 1 and 3, the caliper bridge 52 may be integrally formed with the caliper housing 50 or may be a separate part that is fixedly disposed on the caliper housing 50. For example, the caliper bridge 52 may be coupled to the caliper housing 50 with one or more fasteners, such as bolts. In at least one configuration, the caliper bridge 52 may cooperate with the caliper housing 50 to define a cavity 62 of the brake caliper 22 that receives the brake pad assemblies 24 and a portion of the brake carrier 20, such as the side abutments 44. The cavity 62 may be encircled by the brake caliper 22 from the perspective shown in FIG. 3. The cavity 62 may provide an opening that facilitates insertion and removal of the brake pad assemblies 24.

Referring to FIG. 1, a pair of brake pad assemblies 24 are received in and supported by the brake carrier 20. The brake pad assemblies 24 may be disposed on opposite sides of the brake rotor 42 and may engage the brake rotor 42 to slow rotation of the brake rotor 42 and an associated wheel hub about a brake rotor axis of rotation 70.

One brake pad assembly 24 may be positioned between the caliper housing 50 and the brake rotor 42 and may be referred to as an inboard brake pad assembly 24 (located above and to the left of the brake rotor 42 from the perspective shown in FIGS. 1 and 2). As is best shown in FIG. 3, the inboard brake pad assembly 24 may be engageable with a first friction surface 72 or inboard-facing friction surface of the brake rotor 42.

The brake pad assembly 24 located on the opposite side of the brake rotor 42 may be positioned between the caliper bridge 52 and the brake rotor 42 and may be referred to as an outboard brake pad assembly 24 (located below and to the right of the brake rotor 42 from the perspective shown in FIGS. 1 and 2). The outboard brake pad assembly 24 may be engageable with a second friction surface 74 or outboard-facing friction surface of the brake rotor 42 that may be disposed opposite the first friction surface 72. The first friction surface 72 and the second friction surface 74 may be disposed substantially perpendicular to the brake rotor axis of rotation 70. The term "substantially perpendicular" is used herein to designate features or axes that are the same as or very close to perpendicular and includes features that are within ±3° of being perpendicular each other. The brake pad assemblies 24 may include a backplate 80 and friction material 82.

Referring primarily to FIGS. 2 and 3, the backplate 80 is a structural member of a brake pad assembly 24. The backplate 80 may be configured as a generally flat plate and may be made of any suitable material, such as metal or a metal alloy. As is best shown in FIG. 3, a front side 84 of the backplate 80 may face toward the brake rotor 42. A back side 86 of the backplate 80 may be disposed opposite the front side 84. The back side 86 of the inboard brake pad assembly 24 may engage or contact a moveable component, such as a tappet that be actuated by the brake actuator and moveable toward and away from the brake rotor 42. The back side 86 of the outboard brake pad assembly 24 may engage or contact the caliper bridge 52. A bottom side of the backplate 80 may face away from the retainer bracket 26 and may face toward and may engage the brake carrier 20. A top side of the backplate 80 may be disposed opposite the bottom side and may face toward the retainer bracket 26. Opposing lateral sides 88 may extend between the top side and the bottom side and may face toward and be configured to engage an adjacent side abutment 44 of the brake carrier 20.

The friction material 82 is disposed on the front side 84 of the backplate 80. The friction material 82 may contact the brake rotor 42 during vehicle braking. The friction material 82 may have a thickness that may extend from a side of the friction material 82 that faces toward the brake rotor 42 to an opposite side that faces toward and may engage the front side 84 of the backplate 80. As such, the thickness of the friction material 82 may extend substantially perpendicular to the direction of travel of the brake pad assembly 24. The thickness of the friction material 82 may decrease due to wear that occurs during braking and contact with a corresponding friction surface of the brake rotor 42.

Referring to FIGS. 1 and 3, the retainer bracket 26, if provided, may be removably mounted to the brake caliper 22. For example, the retainer bracket 26 may extend across the brake pad assemblies 24 and the opening in the brake caliper 22 to help retain the brake pad assemblies 24 in the brake carrier 20 when the retainer bracket 26 is secured to the brake caliper 22. Conversely, the retainer bracket 26 may be detached from or removed from the brake caliper 22 to permit removal of the brake pad assemblies 24 or installation of the brake pad assemblies 24 via the opening.

Referring to FIG. 2, one or more guide pin assemblies 28 extend from the brake carrier 20. A guide pin assembly 28 may extend along a guide pin axis 90. A guide pin assembly 28 may slidably couple the caliper housing 50 to the brake carrier 20 such that the caliper housing 50 may slide along a guide pin axis 90 with respect to the guide pin assembly 28. A guide pin assembly 28 may extend from the brake carrier 20 into a corresponding guide pin opening in the brake caliper 22. A guide pin assembly 28 may have any suitable configuration. For instance, a guide pin assembly 28 may include a fastener 92, such as a bolt, that may extend through a sleeve 94 and fixedly couple the sleeve 94 to the brake carrier 20. The sleeve 94 may be fixedly positioned with respect to the brake carrier 20. The caliper housing 50 may be slidable along a guide pin axis 90 and with respect to the sleeve 94. The guide pin axes 90 may be disposed substantially parallel to each other. The term "substantially parallel" as used herein means the same as or very close to parallel and includes features or axes that are within ±3° of being parallel each other.

Operation of the brake assembly 10 will now be described in more detail. As an overview, the brake assembly 10 may start in a retracted position or retracted state in which braking of the vehicle is not requested. As such, the brake pad assemblies 24 may be retracted away from the brake rotor 42 and spaced apart from the brake rotor 42. In response to a vehicle braking command, the brake actuator may be operated to exert force that moves the inboard brake pad assembly 24 into contact with the inboard-facing first friction surface 72 of the brake rotor 42. A reaction force may then move the brake caliper 22 along the guide pin axes 90 with respect to the brake carrier 20 to actuate the outboard brake pad assembly 24 that is disposed between the brake rotor 42 and the caliper bridge 52 into engagement with the outboard-facing second friction surface 74 of the brake rotor 42 to help slow rotation of the brake rotor 42 and an associated vehicle wheel. Retracting or releasing the brake actuator may allow the actuation sequence to proceed in reverse.

Referring to FIGS. 1 and 2, the friction material measurement system 30 is provided to facilitate measurement of the friction material 82. The friction material measurement system 30 includes a tool 100 and at least one member, such as a first member 102 and a second member 104.

The tool 100 is fixedly positioned with respect to the brake carrier 20. In addition, the tool 100 may be mounted to any suitable location or structure of the brake carrier 20. For instance, the tool 100 may be fixedly mounted to a portion of brake carrier 20, such as a side abutment 44, a connecting member that extends over the brake rotor 42, or the like. The tool 100 may be mounted to the brake carrier 20 in any suitable manner, such as with a fastener, clip, adhesive, interference fit, or the like. In addition, the tool 100 may be mounted on any suitable surfaces of the brake carrier 20 in a manner that does not interfere with movement of the brake pad assemblies 24. For instance, the tool 100 may be disposed on a distal end surface 46 of the side abutment 44.

The tool 100 may be separated from the brake caliper 22 such that the tool 100 does not contact the brake caliper 22 or does not interfere with movement of the brake caliper 22. The tool 100 has at least one indicator region 110.

Referring primarily to FIGS. 2 and 3, an indicator region provides visual information indicative of the state of wear of the friction material of a brake pad assembly 24. An indicator region may be provided on a visible exterior surface of the tool 100. In the configuration shown, two indicator regions are illustrated and are designated with different reference numbers for clarity. A first indicator region 112 is associated with the first member 102 and may be used to determine the state of wear of friction material 82 of a first brake pad assembly 24. A second indicator region 114 is associated with the second member 104 and may be used to determine the state of wear of friction material 82 of a second brake pad assembly 24.

An indicator region may include one or more markings that may represent or indicate the state of wear. The markings may be of any suitable type. For instance, a single marking may be provided that may delineate or separate different states of wear. For instance, a marking may denote or separate a "do not replace" indication and a "replace" or "service" indication. As other examples, one or more bands or color-coded regions may be provided that indicate different levels of wear. For instance, a first band (e.g., green band) may indicate that a brake pad assembly 24 has ample friction material 82, a second band (e.g., yellow band) may indicate that the brake pad assembly 24 has sufficient friction material 82 for use but has worn to the point that replacement may be needed soon, and a third band (e.g., red band) that may indicate that friction material 82 of the brake pad assembly 24 is at or near the end of its useful life and should be replaced. As such, the first, second, and third bands may represent increasing levels of wear of the friction material 82. As another example, markings may be configured as a scale or ruler that may include delineations, numbers, characters, or combinations thereof that display or represent the thickness of the friction material. It is contemplated that the markings may be raised, recessed, level with the tool, or combinations thereof. It is also contemplated that multiple marking sections or sets of markings may be provided to facilitate wear assessments or wear measurements for different brake assembly configurations.

The indicator regions 112, 114 may be separated from each other or contiguous. In the configuration shown, the indicator regions 112, 114 are contiguous and extend in opposite directions from a common center marking, which is designated with the letter S, to opposing remote markings, which are designated with the letter N. The letter S may stand for "service" or a point friction material 82 of the brake pad assembly 24 is at or near the end of its useful life and should be replaced. The letter N may stand for "new" or the amount of friction material when the friction material 82 is new or unworn. The "½" markings may represent that the friction material 82 of a corresponding brake pad assembly 24 is half worn or worn by approximately 50% with respect to its initial new or unworn state.

Referring to FIGS. 2 and 4, the tool 100 may have any suitable configuration. In at least one configuration the tool 100 extends through the cavity 62 of the brake caliper 22; however, it is contemplated that the tool 100 need not extend through the cavity 62 but instead could extend around and over the brake caliper 22 without extending through the cavity 62 in various configurations. In at least one configuration, the tool 100 may include a first segment 120, a second segment 122, and a third segment 124; however, it is contemplated that a different number of segments may be provided and that one or more segments may have a different orientation or shape than that shown. For instance, a segment or a portion of a segment may be curved rather than planar or linear.

The first segment 120 may engage the brake carrier 20 and may be attached to the brake carrier 20. For example, the first segment 120 may be disposed on a side abutment 44 of the brake carrier 20. The first segment 120 may be disposed on any suitable side or sides of the side abutment 44, such as the distal end surface 46, an outer side that faces away from the brake pad assembly 24, an inner side that faces toward the brake pad assembly 24, an inboard side that faces away from the brake rotor 42, an outboard side that faces toward the brake rotor 42, or combinations thereof. In at least one configuration, the first segment 120 may have a hole 130 through which the tab 48 of the side abutment 44 may protrude to help orient and position the tool 100 with respect to the brake carrier 20.

The second segment 122 may extend from the first segment 120. For instance, the second segment 122 may extend from an end of the first segment 120 in a direction that extends away from the brake carrier 20. The second segment 122 may extend through the cavity 62 of the brake caliper 22 and protrude from the cavity 62 in one or more configurations. In at least one configuration, the second segment 122 may be disposed inboard with respect to the side abutment 44 or further from the caliper bridge 52 than the side abutment 44 and may be disposed substantially perpendicular to the first segment 120.

The third segment 124 may extend from the second segment 122. For instance, the third segment 124 may extend from an end of the second segment 122 in a direction that extends away from the brake rotor 42. The third segment 124 may be disposed outside of the cavity 62 of the brake caliper 22. Positioning the third segment 124 inboard and near or over the caliper housing may allow the state of wear to be assessed without removing the wheel from the wheel hub. In at least one configuration, the third segment 124 may extend inboard from the second segment 122 and may be disposed substantially perpendicular to the second segment 122. The indicator region 110 may be provided on the third segment 124.

A multi-segment configuration as described above may allow the tool to extend out of the cavity 62 yet allow the brake caliper 22 to accommodate a pad shield that may generally cover the opening of the cavity 62. However, it is contemplated that other configurations may be provided, such as providing the tool 100 in which the second segment 122 extends along an arc from the first segment 120 to the third segment 124.

Referring primarily to FIG. 2, the first member 102 is fixedly positioned with respect to a brake pad assembly 24, such as the inboard brake pad assembly 24. The first member 102 may be fixedly coupled to any suitable location on the brake pad assembly 24, such as to the backplate 80. Alternatively, the first member 102 may be coupled to a component that is moveable with the backplate 80, such as a tappet that engages the backplate 80, a pad spring that is disposed on the backplate 80, or the like. Regardless as to whether the first member 102 is mounted to the brake pad assembly 24 or another component that is moveable with the brake pad assembly 24, the first member 102 may be coupled to that component in any suitable manner, such as with a fastener, clip, adhesive, interference fit, or the like. In addition, the first member 102 may be spaced apart from the brake caliper 22 so as not to interfere with movement of the brake caliper 22. As such, the first member 102 may not contact the brake caliper 22. In addition, the first member 102 may be spaced apart from and may not contact the brake carrier 20. In at least one configuration, the first member 102 may extend out of the cavity 62 and may extend to a location that is near the first indicator region 112 of the tool 100.

The first member 102 may have any suitable configuration. In the configuration shown, the first member 102 is generally L-shaped with a first portion 140 that extends through the cavity 62 and a second portion 142 that extends from an end of the first portion 140 toward the indicator region 110. In such a configuration, the first member 102 may extend over the brake caliper 22.

The state of wear of the friction material 82 of the first brake pad assembly 24 may be indicated where the first member 102 is aligned with the first indicator region 112. Alignment may be based on where a reference feature 150 of the first member 102 is aligned with the first indicator region 112. In the configuration shown, the reference feature 150 is the end of the first member 102. Alternatively, the reference feature 150 may be provided in a different location that is spaced apart from the end of the first member 102. Such a reference feature 150 may have any suitable configuration, such as a protrusion, indentation, aperture, mark, or the like that may be visually alignable with the indicator region.

The second member 104 is fixedly positioned with respect to a brake pad assembly 24, such as the outboard brake pad assembly 24. The second member 104 may be fixedly coupled to any suitable location on the brake pad assembly 24, such as to the backplate 80. Alternatively, the second member 104 may be coupled to a component that is moveable with the backplate 80, such as the brake caliper 22, a pad spring that is disposed on the backplate 80, or the like. Regardless as to whether the second member 104 is mounted to the brake pad assembly 24 or another component that is moveable with the brake pad assembly 24, the second member 104 may be coupled to that component in any suitable manner, such as with a fastener, clip, adhesive, interference fit, or the like. In addition, the second member 104 may be spaced apart from and may not contact the brake carrier 20. In at least one configuration, the second member 104 may be spaced apart from the brake caliper 22; however, it is also contemplated that the second member 104 may be mounted to the brake caliper 22. The second member 104 may extend to a location that is near the second indicator region 114 of the tool 100. In at least one configuration, such as a configuration in which the second member 104 is mounted to the outboard brake pad assembly 24, the second member 104 may extend out of the cavity 62. The second member 104 may extend over the friction material 82 of the outboard brake pad assembly 24, the friction material 82 of the inboard brake pad assembly 24, or both.

The second member 104 may have any suitable configuration. In the configuration shown, the first member is generally L-shaped with a first portion 140' that extends through the cavity 62 and a second portion 142' that extends from an end of the first portion 140' toward the indicator region 110. It is contemplated that the first portion 140' can be omitted, such as when the second member 104 is mounted to the brake caliper 22 or provided with the brake caliper 22. The second member 104 may have a different configuration from the first member 102. As an example, the second member 104 have a greater length than the first member 102 (e.g., the second portion 142' may be longer than the second portion 142), such as in a configuration in which the second member 104 is mounted to the backplate 80. In such a configuration, the second member 104 may extend over the brake caliper 22 as is best shown in FIG. 3.

The state of wear of the friction material 82 of the second brake pad assembly 24 may be indicated where the second member 104 is aligned with the second indicator region 114. Alignment may be based on where a reference feature 150' of the second member 104 is aligned with the second indicator region 114. In the configuration shown, the reference feature 150' is the end of the second member 104. Alternatively, the reference feature 150' may be provided in a different location that is spaced apart from the end of the second member 104. Such a reference feature 150' may have any suitable configuration, such as a protrusion, indentation, aperture, mark, or the like that may be visually alignable with the indicator region.

Referring to FIGS. 3-6, method steps associated with measuring or determining the state of wear of the friction material 82 of a brake pad assembly 24 will now be described. Friction material 82 of a brake pad assembly 24 may be measured when the brake pad assembly 24 is installed on the brake assembly 10 (i.e., received in the brake carrier 20 of the brake assembly 10) as well as when the brake rotor 42 is received by the brake assembly 10. As such, friction material 82 may be measured when the brake assembly 10 is installed on a vehicle and without removing the brake pad assembly 24 from the brake assembly 10.

Friction material 82 may be measured when the brake pad assembly 24 is retracted (i.e., when the friction material 82 is spaced apart from the brake rotor 42) or extended (i.e., when the friction material 82 is in contact with a friction surface of the brake rotor 42), noting that the indicator region 110 of the tool 100 may be positioned slightly differently when calibrated for measuring a retracted brake pad assembly as compared to an extended brake pad assembly to account for the presence or absence of the running clearance.

The friction material measurement system 30 may allow the friction material 82 of the inboard brake pad assembly 24 and the friction material 82 of the outboard brake pad assembly 24 to be measured independently. This may allow more precise measurement of the friction material 82 that is present on a specific brake pad assembly 24 since the friction material 82 may not wear evenly on the inboard brake pad assembly 24 and the outboard brake pad assembly 24.

FIGS. 3 and 4 illustrate brake pad assemblies 24 in which the friction material 82 is not worn. In this example, the reference feature 150 of the first member 102 is the distal end or free end of the first member 102. The reference feature 150 is aligned with the "N" marking on the first indicator region 112, thereby indicating that the associated friction material 82 is in a new or unworn condition. Similarly, the reference feature 150' of the second member 104 is the distal end or free end of the second member 104. The reference feature 150 is aligned with the "N" marking on the second indicator region 114, thereby indicating that the associated friction material 82 is in a new or unworn condition. The distal end of the tool 100 and the distal end of the first member 102 may be positioned closer to the brake actuator mount 60 than the distal end of the second member 104 is positioned to the brake actuator mount 60 when the friction material 82 is not worn.

As the thickness of the friction material 82 of the inboard brake pad assembly 24 decreases, the backplate 80 of the inboard brake pad assembly 24 will move closer to the brake rotor 42 to maintain a desired running clearance due to operation of the wear adjuster mechanism. Similarly, as the thickness of the friction material 82 of the outboard brake pad assembly 24 decreases, the backplate 80 of the outboard brake pad assembly 24 will move closer to the brake rotor 42. As a result, the brake caliper 22 will slide to the left from the perspective in position shown in FIG. 4 toward the position shown in FIG. 6. In response, the distal end of the first member 102 may move closer to the distal end of the second member 104 as the friction material 82 of either brake pad assembly 24 or both brake pad assemblies wear and the friction material thickness decreases.

Figure 5:
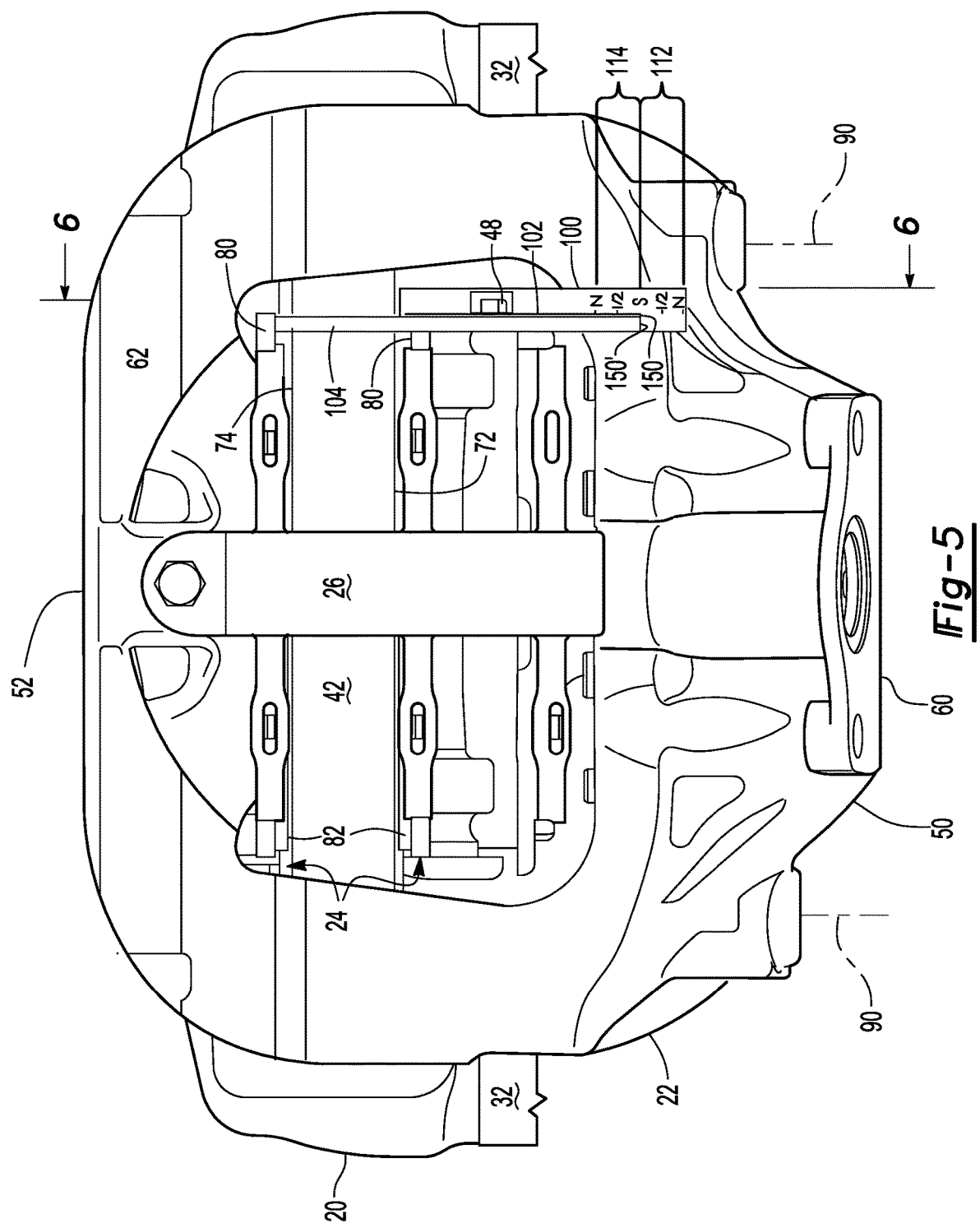
FIG. 5 is a plan view of the brake assembly with worn brake pad assemblies.
Figure 6:
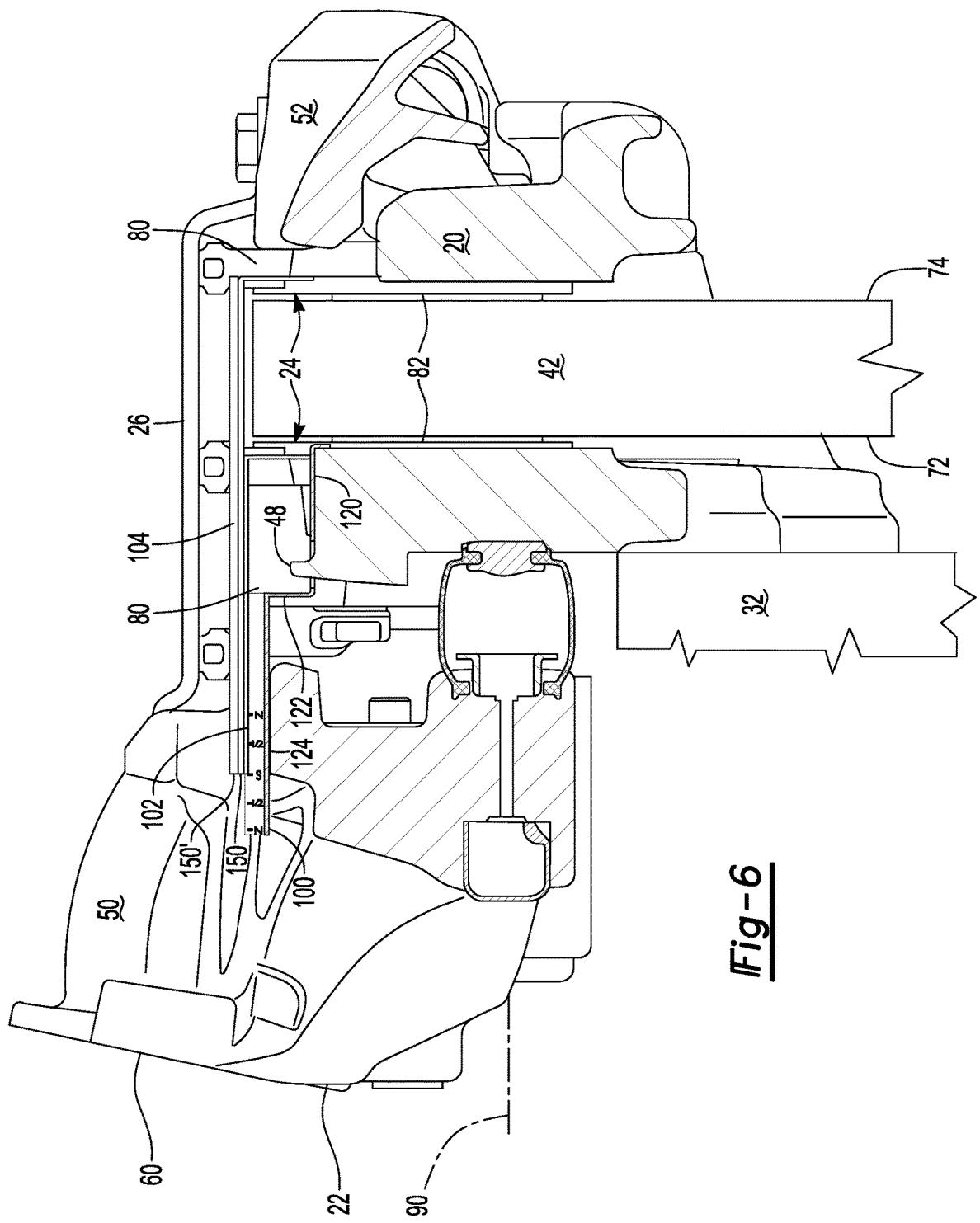
FIG. 6 is a section view along section line 6-6.

FIGS. 5 and 6 illustrate brake pad assemblies 24 in which the friction material 82 that is fully worn or nearly fully worn. In this example, the reference feature 150 of the first member 102 is the distal end or free end of the first member 102. The reference feature 150 is aligned with the "S" marking on the first indicator region 112, thereby indicating that the friction material 82 is worn and may need replacement soon. Similarly, the reference feature 150' of the second member 104 is the distal end or free end of the second member 104. The reference feature 150 is aligned with the "S" marking on the second indicator region 114, thereby indicating that the friction material 82 is worn and may need replacement soon. The first indicator region 112 and the second indicator region 114 may have different service markings or share a common service marking as shown.

A brake assembly having a friction material measurement system as described above may allow brake pad assemblies to be independently measured without removing the brake pad assemblies from the brake assembly and while the brake assembly is installed on a vehicle, which may reduce inspection time and associated costs. The thickness of the friction material may be quickly and accurately assessed to determine whether replacement of a brake pad assembly is warranted. Thickness of the friction material may be measured indirectly and without contacting the friction material, which may make it easier to obtain measurements when the brake pad assemblies are installed and the brake rotor is present. Measurements may be made without using the brake rotor as a reference point for measurement purposes, thereby avoiding measurement error that may occur if the brake rotor is pitted, worn, or not substantially perpendicular to its axis of rotation. In addition, measurements may be made without directly measuring the thickness of the friction material, thereby avoiding measurement error that may occur when the friction material is pitted or worn at an angle that is not substantially perpendicular to the direction of travel of the brake pad assembly. The friction material measurement system may be provided with the brake assembly rather than as a separate measurement device that may be misplaced by a technician.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a brake carrier;
   a brake caliper that is moveably disposed on the brake carrier;
   first and second brake pad assemblies that are received in and supported by the brake carrier, the first and second brake pad assemblies each having a backplate and friction material that is disposed on the backplate; and
   a friction material measurement system for measuring the friction material, the friction material measurement system including:
      a tool that is fixedly positioned with respect to the brake carrier; and
      a first member that is fixedly positioned with respect to the backplate of the first brake pad assembly; and
      a second member that is fixedly positioned with respect to the backplate of the second brake pad assembly, wherein the first member does not contact the second brake pad assembly and the second member does not contact the first brake pad assembly.

2. The brake assembly of claim 1 wherein the tool and first the member cooperate to provide visual information indicative of a state of wear of the friction material.

3. The brake assembly of claim 2 wherein the tool has an indicator region and the state of wear of the friction material is indicated where the first member is aligned with the indicator region.

4. The brake assembly of claim 1 wherein the tool is mounted to the brake carrier.

5. The brake assembly of claim 1 wherein the tool is separated from the brake caliper such that the tool does not contact the brake caliper.

6. The brake assembly of claim 1 wherein the tool is mounted to a side abutment of the brake carrier that is engageable with a lateral side of the backplate to inhibit circumferential movement of the first brake pad assembly.

7. The brake assembly of claim 6 wherein the brake caliper defines a cavity that receives the first brake pad assembly and the side abutment, and the tool extends from the side abutment out of the cavity.

8. The brake assembly of claim 7 wherein the tool is disposed on a distal end surface of the side abutment that is received in the cavity.

9. The brake assembly of claim 8 wherein the side abutment has a tab that protrudes from the distal end surface and extends through a hole in the tool.

10. The brake assembly of claim 1 wherein the tool has a first segment that engages the brake carrier, a second segment that extends from the first segment in a direction that extends away from the brake carrier, and a third segment that extends from the second segment and is disposed outside of a cavity in the brake caliper.

11. The brake assembly of claim 10 wherein the tool has an indicator region that is provided on the third segment.

12. A brake assembly comprising:
   a brake carrier;
   a brake caliper that is moveably disposed on the brake carrier;
   a first brake pad assembly that is supported by the brake carrier and that has a first backplate and a first friction material that is disposed on the first backplate;
   a second brake pad assembly that is supported by the brake carrier and that has a second backplate and a second friction material that is disposed on the second backplate;
   a friction material measurement system for measuring friction material, the friction material measurement system including:
      a tool that is fixedly positioned with respect to the brake carrier;
      a first member that is fixedly positioned with respect to the first backplate; and
      a second member that is fixedly positioned with respect to the second backplate, wherein the tool includes a first indicator region and a second indicator region, a state of wear of the first friction material of the first brake pad assembly is indicated where the first member is aligned with the first indicator region, and a state of wear of the second friction material is indicated where the second member is aligned with the second indicator region.

13. The brake assembly of claim 12 wherein the first member is fixedly mounted to the first backplate and the second member is fixedly mounted to the second backplate.

14. The brake assembly of claim 12 wherein the tool, the first member, and the second member extend out of a cavity of the brake caliper inside which the first brake pad assembly and the second brake pad assembly are received.

15. The brake assembly of claim 12 wherein the tool, the first member, and the second member are spaced apart from and do not contact the brake caliper and the first member and the second member are spaced apart from and do not contact the brake carrier.

16. The brake assembly of claim 12 wherein the second member overlaps the first member such that the first member is positioned between the tool and the second member.

17. The brake assembly of claim 12 wherein the second member extends over the first friction material of the first brake pad assembly and the second friction material of the second brake pad assembly.

18. The brake assembly of claim 12 wherein an end of the first member moves closer to an end of the second member as the first friction material wears.

19. A brake assembly comprising:
a brake carrier;
a brake caliper that is moveably disposed on the brake carrier;
a first brake pad assembly that is supported by the brake carrier and that has a first backplate and a first friction material that is disposed on the first backplate;
a second brake pad assembly that is supported by the brake carrier and that has a second backplate and a second friction material that is disposed on the second backplate;
a friction material measurement system for measuring friction material, the friction material measurement system including:
a tool that is fixedly positioned with respect to the brake carrier;
a first member that is fixedly positioned with respect to the first backplate; and
a second member that is fixedly positioned with respect to the second backplate, wherein the tool, an end of the first member, and an end of the second member extend over the brake caliper and the end of the tool and end of the first member are positioned closer to a brake actuator mount of the brake caliper than the end of the second member is positioned to the brake actuator mount.

20. The brake assembly of claim 19 wherein the tool includes a first indicator region and a second indicator region, a state of wear of the first friction material of the first brake pad assembly is indicated where the first member is aligned with the first indicator region, and a state of wear of the second friction material is indicated where the second member is aligned with the second indicator region.

* * * * *